United States Patent
Breton et al.

(10) Patent No.: US 11,668,813 B2
(45) Date of Patent: Jun. 6, 2023

(54) METHOD FOR MEASURING WAVE HEIGHT BY MEANS OF AN AIRBORNE RADAR

(71) Applicant: THALES, Courbevoie (FR)

(72) Inventors: Pierre-Albert Breton, Mérignac (FR); Vincent Corretja, Mérignac (FR); Richard Montigny, Mérignac (FR); Stéphane Kemkemian, Elancourt (FR)

(73) Assignee: THALES, Courbevoie (FR)

( * ) Notice: Subject to any disclaimer, the term of this patent is extended or adjusted under 35 U.S.C. 154(b) by 365 days.

(21) Appl. No.: 15/734,667

(22) PCT Filed: Jun. 13, 2019

(86) PCT No.: PCT/EP2019/065557
§ 371 (c)(1),
(2) Date: Dec. 3, 2020

(87) PCT Pub. No.: WO2019/243164
PCT Pub. Date: Dec. 26, 2019

(65) Prior Publication Data
US 2021/0223385 A1 Jul. 22, 2021

(30) Foreign Application Priority Data
Jun. 19, 2018 (FR) ..................... 1800632

(51) Int. Cl.
*G01S 13/88* (2006.01)
*G01B 15/02* (2006.01)

(52) U.S. Cl.
CPC .............. *G01S 13/88* (2013.01); *G01B 15/02* (2013.01); *G01S 13/882* (2013.01)

(58) Field of Classification Search
CPC ........ G01S 13/88; G01S 13/935; G01S 13/95; G01S 13/953; G01S 13/955; G01B 15/02
See application file for complete search history.

(56) References Cited

U.S. PATENT DOCUMENTS

| 5,469,168 A | * | 11/1995 | Anderson | ............. G01S 13/951 342/192 |
| 5,808,741 A | * | 9/1998 | Anderson | ............. G01C 13/002 73/170.31 |

(Continued)

FOREIGN PATENT DOCUMENTS

| FR | 2 480 945 A1 | 10/1981 |
| WO | 92/21041 A1 | 11/1992 |

OTHER PUBLICATIONS

Raney, et al., "An airborne CryoSat prototype: the D2P radar altimeter", IEEE International Geoscience and Remote Sensing Symposium, vol. 3, pp. 1765-1767, Jun. 24, 2002.

*Primary Examiner* — Peter M Bythrow
(74) *Attorney, Agent, or Firm* — BakerHostetler

(57) ABSTRACT

A method for determining wave height by means of a radar carried by an aircraft, the method implementing the following steps: a first step of pointing the antenna of the radar; a second step of determining the clutter acquisition plan according to the altitude of the aircraft; a third step of determining, for each clutter zone defined by the acquisition plan, two Doppler parameters PARA1 and PARA2 characterising the zone as a whole; a fourth step of calculating the average values of the parameters PARA1 and PARA2 over all of the zones in question; and a fifth step of estimating the wave height from the averages of the parameters PARA1 and PARA2. The wave height estimated in this way is transmitted to the aircraft and used to determine the conditions for the water landing of the aircraft.

8 Claims, 5 Drawing Sheets

(56) References Cited

U.S. PATENT DOCUMENTS

| | | | | |
|---|---|---|---|---|
| 5,923,283 | A * | 7/1999 | Gouenard | G01S 13/955 |
| | | | | 342/123 |
| 7,095,364 | B1 * | 8/2006 | Rawdon | G01S 13/87 |
| | | | | 701/4 |
| 7,808,426 | B1 * | 10/2010 | Smith, Jr. | G01S 13/003 |
| | | | | 342/123 |
| 2010/0321231 | A1 * | 12/2010 | Nakahama | G01S 7/062 |
| | | | | 342/159 |
| 2016/0157073 | A1 * | 6/2016 | Ishikawa | G01C 13/00 |
| | | | | 455/404.1 |
| 2016/0209260 | A1 * | 7/2016 | Rice | G01S 13/583 |
| 2016/0306833 | A1 * | 10/2016 | Esposito | G01S 13/87 |
| 2016/0341824 | A1 * | 11/2016 | Marconnet | G01S 13/70 |
| 2017/0090017 | A1 * | 3/2017 | Lenes | G01N 33/1833 |
| 2017/0314920 | A1 * | 11/2017 | Yamada | G01S 7/41 |
| 2017/0315225 | A1 * | 11/2017 | Lee | G01S 13/585 |
| 2017/0315232 | A1 * | 11/2017 | Barrick | G01S 13/886 |
| 2017/0322303 | A1 * | 11/2017 | Reynolds | G01S 19/072 |
| 2018/0336308 | A1 * | 11/2018 | Dokken | G01S 13/87 |
| 2019/0086534 | A1 * | 3/2019 | Frick | G01S 13/582 |
| 2019/0161152 | A1 * | 5/2019 | Kusters, Jr. | G01S 13/88 |
| 2019/0179011 | A1 * | 6/2019 | Yamada | G01S 13/534 |
| 2020/0233075 | A1 * | 7/2020 | Sakamaki | G01S 13/88 |

* cited by examiner

METHOD FOR MEASURING WAVE HEIGHT BY MEANS OF AN AIRBORNE RADAR

CROSS-REFERENCE TO RELATED APPLICATIONS

This application is a National Stage of International patent application PCT/EP2019/065557, filed on Jun. 13, 2019, which claims priority to foreign French patent application No. FR 1800632, filed on Jun. 19, 2018, the disclosures of which are incorporated by reference in their entirety.

FIELD OF THE INVENTION

The invention relates to the general field of maritime surveillance and aircraft charged with such operations.

It relates in particular to maritime surveillance seaplanes and the problems associated with water landing conditions and wave height measurement.

BACKGROUND

Maritime surveillance radars are installed on various carriers, including on certain classes of seaplanes.

To land on water in total safety, these seaplanes have to monitor the height of the waves in order to check that it is below a safety threshold.

These days, this height is generally acquired via measurement infrastructures positioned at sea level or embedded on ships and transmitted to the seaplane considered.

In order to increase autonomy, the line personnel want to have, onboard the aircraft, means for autonomously estimating the height of the waves, notably in the water landing zone. Such autonomy would allow greater freedom in defining missions and greater flight plan flexibility.

These days, the radar installations used to measure the height of the waves are essentially fixed installations comprising a surface radar dedicated to a greater or lesser extent to this measurement task. However, these installations operate with constraints that are very different from those that can be imposed in the context of the invention. In particular, the signal acquisition time used to calculate this height can be several minutes, a time that is incompatible with the operation of an embedded radar.

Consequently, performing a measurement of the height of the waves by using the radar embedded onboard entails defining and designing a processing chain incorporated in the airborne radar that offers the following characteristics:

The signal analysis time must be relatively short in order to not constrain the trajectory of the seaplane and not prohibitively mobilize the radar. The analysis time should to this end be of the same order of that required for other processing operations such as maritime target imaging processing operations of ISAR ("Inverse Synthetic Aperture Radar") type, that is to say typically less than ten or so seconds.

The altitude of the aircraft at which the height of the waves is estimated must be high enough, typically greater than 100 feet, to allow a cancellation of the water landing maneuver in total safety.

The processing implemented must provide a measurement of the height of the waves with the expected accuracy (maximum error on the estimation of the wave height of the order of 50 cm) and independently in all the water landing contexts. On static systems, the accuracy of the estimation of the wave height at a given point in fact relies on a calibration of the measurement using external sensors (bouée) which cannot be envisaged in the context of an embedded system for which autonomy is desired.

At the current time there are two known types of radar signal processing methods that allow the height of the waves to be estimated by analyzing the signal backscattered by the surface of the sea with an X band radar:

the methods based on the inversion of the Modulation Transfer Function (MTF);

the methods based on the analysis of the Doppler frequencies of the backscattered signal.

The general principle of the methods based on the inversion of the MTF of the backscattered signal is to determine the height of the waves from the power of the sea clutter samples.

For this, over a given measurement time, a radar picks up a sea clutter signal from which it forms an image corresponding to the distribution of the received power in a distance/time (or recurrences) reference frame. On such an image, presented by way of illustration in FIG. 1, the intensity of each pixel represents the received signal power for the signal sample corresponding a given distance cell for a given recurrence.

With sea clutter, the duly constructed image is structured according to vertical "stripes", oriented according to the time axis (recurrences axis) reflecting the presence of waves on the surface of the water.

According to this method, the height of the waves is deduced from this structure, the height of the waves being accessible through the power of the sea clutter.

In the context considered, the use of such a method presents certain drawbacks:

Firstly, it is a method, costly from a computational point of view, which requires an intermediate processing step.

Indeed, the "image capture by radar" results in a distortion of the image created, a distortion which can be modeled by a function called "Modulation Transfer Function" (MTF).

Consequently, the accurate determination of the height of the waves entails estimating this MTF then inverting it. The inverted MTF is then applied to the 2D Fourier transform of the distance/time image formed from the received radar signal. Then, the inverse Fourier transform is applied to the image thus obtained by application of the inverted MTF so as to obtain a distance/time image corrected of the distortions from which the heights of the waves are estimated.

Secondly, this type of method entails a calibration.

Indeed, the MTF calculation depends on the context (place, radar altitude, etc.), so that, to calibrate this MTF, it is necessary to have ground means (i.e. on the sea) for this type of method that is not very (or even not at all) compatible with mobile and autonomous use.

Thirdly, this type of method allows the height of the waves to be determined only with a limited accuracy because it is based on the underlying hypothesis that the height of the waves is proportional to the power of the sea clutter. Moreover, the modulation of the power of the signal due to the "tilt" of the waves, is highly sensitive to the altitude of the sensor, and therefore not particularly suited to performing measurements from an aircraft.

Finally, lastly, this type of method, which allows an estimation of the wave height for each wave, appears over specified with respect to the consistent need to determine the average height of the waves in a given zone.

The methods based on the analysis of the Doppler frequencies of the backscattered signal are, for their part, based on the fact that the meaningful height of the waves can be, as is known, correlated with the standard deviation of the Doppler frequencies measured at a given point of a zone considered.

According to this type of method, the Doppler frequencies of the signal received at this point are calculated over a given period, of the order of 15 minutes for example. Moreover, as is known, the meaningful height of the waves $h_s$ is linked to the standard deviation $\sigma_v$ of the speeds (i.e. of the Doppler frequencies).

It is recalled here that the meaningful height of the waves $h_s$ represents the average value of the height of a third of the waves of greatest height over the zone considered and for the duration of the observation performed.

This type of method offers an approach that is more accurate and simpler to implement than the conventional methods, based on the estimation of the MTF. It does however present the drawback of requiring an analysis time that is incompatible with use in an operational context such as a water landing maneuver; the time to analyze the sea clutter, which entails servo controlling the antenna in a given direction, being too great.

Consequently, since neither of the types of methods explained previously give real satisfaction in the particular operational context considered here, there is currently a need to find a radar signal processing means that allows the height of the waves to be estimated simply and rapidly.

SUMMARY OF THE INVENTION

One aim of the invention is notably to propose such a means, in other words to propose a method that allows the height of the waves to be estimated from the signal picked up by an airborne radar, said method taking into account the following operational constraints:
- the response time must be short, typically less than 10 seconds;
- the processing implemented must be applied in different maritime contexts without requiring a calibration step;
- the accuracy of the estimation of the wave height must be reliable and accurate, and above all avoid the risks of underestimating the wave height.

To this end, the subject of the invention is a method for determining the height of the waves by means of a radar borne by an aircraft, said method implementing the following steps:
- a first step of pointing the antenna of the radar;
- a second step of determining the plan of acquisition of the clutter as a function of the altitude of the aircraft;
- a third step of determining, for each zone of clutter defined by the acquisition plan, two Doppler parameters PARA1 and PARA2 characterizing said zone as a whole;
- a fourth step of calculating, for each of the parameters PARA1 and PARA2 calculated in the third step, the average value of said parameter over all of the zones considered;
- a fifth step of actually estimating the wave height from the averages of the parameters PARA1 and PARA2 calculated in the fourth step.

The wave height thus estimated is intended to be transmitted to the aircraft to determine the water landing conditions thereof.

According to the embodiment considered, the method according to the invention can have the complementary or alternative features listed hereinbelow. These features can each be considered separately or else in combination with one or several other features.

According to a first feature, the third step itself comprises three substeps:
- a first substep of acquiring the signal corresponding to the zone considered;
- a second substep of Doppler preprocessing which determines the matrix of the instantaneous frequencies of the received signal, represented in the distance/time (or distance/recurrences) space;
- a third substep of calculating, for each zone, the value of two parameters PARA1 and PARA2 from the matrix of the instantaneous frequencies delivered by the second substep.

According to the invention, the parameter PARA1, corresponding to the standard deviation, over all of the distance cells, of the average Doppler frequencies calculated for each distance cell, over all of the recurrences forming the zone considered. The parameter PARA2, for its part, corresponds to the ratio of the first parameter PARA1 to the standard deviation of the average Doppler frequency of the signal for each recurrence.

According to another feature, the second substep of the third step of Doppler preprocessing, implements:
- a first operation of calculating the matrix of the instantaneous frequencies of the signal represented in the distance/time (or distance/recurrences) space;
each instantaneous Doppler frequency $f_d$ of said matrix being determined, for each distance cell and each recurrence defining the zone considered, from the relationship:

$$f_d = \frac{d\varphi \times PRF}{2 * \pi}$$

in which PRF represents the recurrence period of the radar and in which $d_\varphi$ represents the phase difference, for a given distance cell, between the clutter samples received by the radar for two consecutive recurrences;
- a second operation of calculating a noise-free matrix of the instantaneous frequencies, said matrix being obtained by applying a low-pass filter to the matrix of the instantaneous frequencies calculated by the first operation.

According to another feature, the fifth step performs:
- the calculation, for each of the parameters PARA1 and PARA2, of a first estimation of wave height, $hest_{PARA1}$ and $hest_{PARA2}$ respectively, the calculation being performed for each parameter, by using a given estimator which expresses the wave height estimated as a function of the value of the parameter considered;
- the preparation of a consolidated estimation, Hest, of the wave height, this estimation being a function of the first estimations of wave heights $hest_{PARA1}$ and $hest_{PARA2}$ previously calculated.

According to another feature, the first estimations of wave heights $hest_{PARA1}$ and $hest_{PARA2}$ are determined by the relationship:

$$hest_p = A \times p + B,$$

in which p is the value of the parameter considered, PARA1 or PARA2.

According to another feature, the consolidated estimation of the wave height is defined as being equal to the greatest of the first estimations of wave heights $hest_{PARA1}$ and $hest_{PARA2}$:

$$Hest = \max(hest_{PARA1}, hest_{PARA2})$$

According to another feature, the consolidated estimation of the wave height is defined as being equal to the average of the first estimations of wave height $hest_{PARA1}$ and $hest_{PARA2}$.

According to another feature, the consolidated estimation of the wave height is defined as being equal to a weighted sum of the first estimations of wave height $hest_{PARA1}$ and $hest_{PARA2}$.

BRIEF DESCRIPTION OF THE DRAWINGS

The features and advantages of the invention will be better appreciated from the following description, a description which is based on the attached figures which present.

It should be noted that, in the attached figures, one and the same functional or structural element preferably bears one and the same reference symbol.

DETAILED DESCRIPTION

The method according to the invention determines the height of the sea based on the measurement of the Doppler frequency of the sea clutter.

This determination mode exploits the fact that the waves generate a modulation of the measured speed because they introduce, by gravity, speed variations measured on the surface of the sea.

The Doppler frequency, which is an intrinsic value of the sea clutter, whose value is impacted neither by the radar nor by its position, is in fact a quantity for which the variability of the measurement is very low. Its measurement does not present the drawbacks cited previously, so that it seems better suited to the conditions of a measurement performed from an aircraft.

It is recalled in this regard that the radial speed of the clutter, $V_r$, is linked to the Doppler frequency by the following relationship:

$$f_d = V_r \cdot (2/\lambda) \qquad [02]$$

in which $\lambda$ represents the wavelength of the emitted radar wave.

Figure 1:
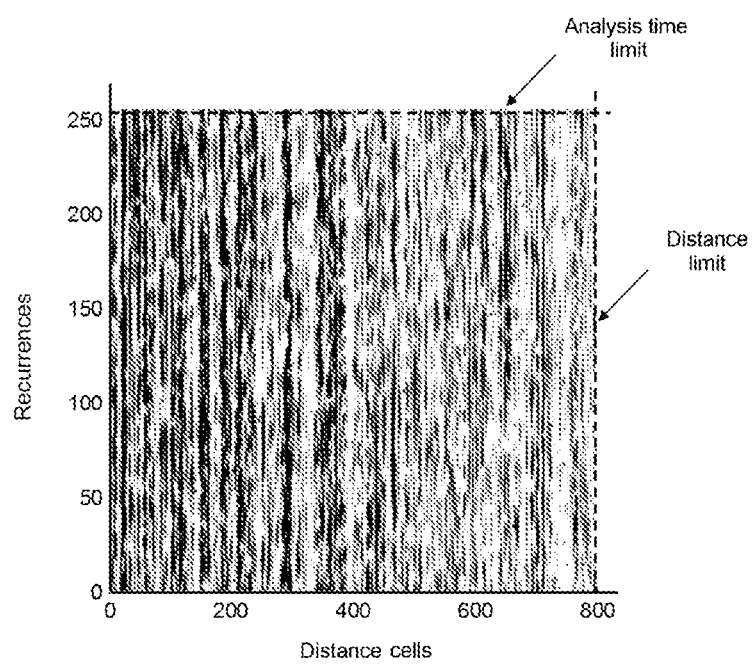
FIG. 1, a simplified, monochrome image graphically representing an example of matrix of the received signal powers, measured for a zone of the space (distance-recurrences cells) of given size.
Figure 2:
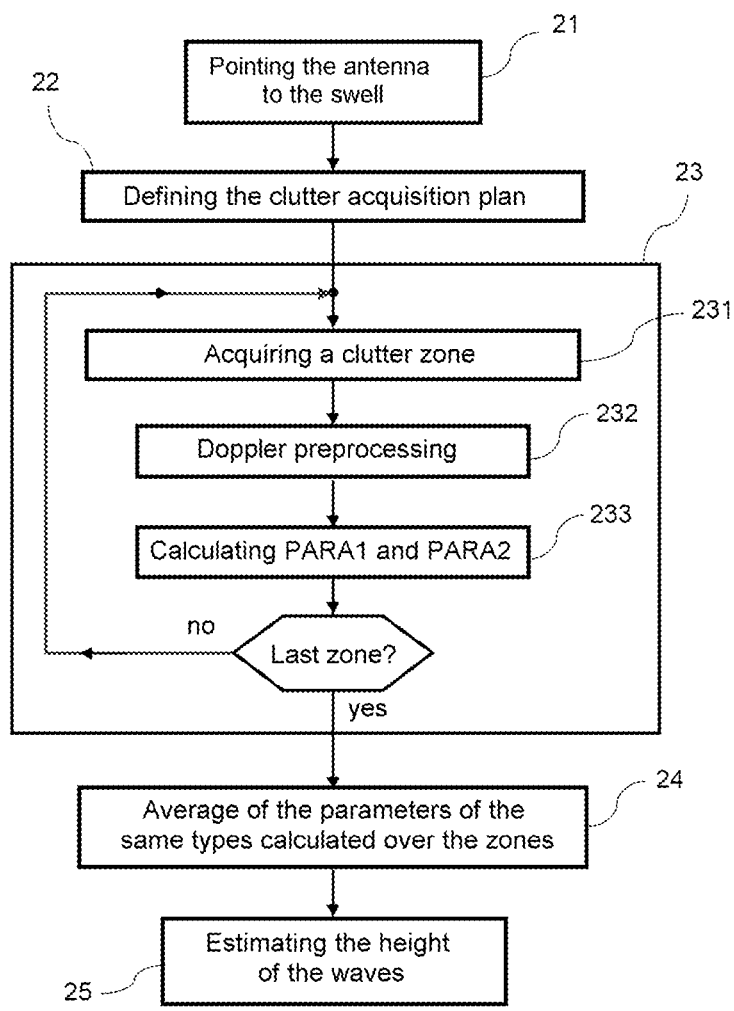
FIG. 2, a theoretical flow diagram presenting the various steps of the method according to the invention.

As FIG. 2 illustrates, the method according to the invention implements the following processing steps:
- a first step 21 of pointing the antenna;
- a second step 22 of determining the clutter acquisition plan as a function of the altitude of the aircraft;
- a third step 23 of determining, for each clutter zone defined by the plan of acquisition, two Doppler parameters PARA1 and PARA2 characterizing said zone.
- a fourth step 24 of calculating, for each parameter, PARA1 or PARA2, the average value over all of the zones of the parameter considered, calculated in the step 23;
- a fifth step 25 of actually estimating the wave height from the averages of the parameters PARA1 and PARA2 calculated in the step 24.

The first step 21 of pointing the antenna consists in guaranteeing that the direction targeted by the radar corresponds to the direction of origin of the swell (with a tolerance of the order of 20°). This step, which can be implemented by any means known to the person skilled in the art, is not detailed further in the context of the present invention.

The second step 22 performs the determination of the clutter acquisition plan. This plan defines, as a function of the altitude of the aircraft, the number of zones to be acquired, the acquisition time for each zone and the position and the length of the zones.

According to the invention, the dimensions of the zones are defined so as to allow an analysis of the space-time correlations of the clutter.

More specifically, a zone is dimensioned so as to contain several swell pseudo-periods. Each zone can thus, for example, have a length greater than or equal to 1000 meters.

Moreover, the acquisition time for a given zone is linked to the hypothesis of stationarity of the clutter over the acquisition time and should therefore be typically less than 0.5 seconds.

Figure 3:
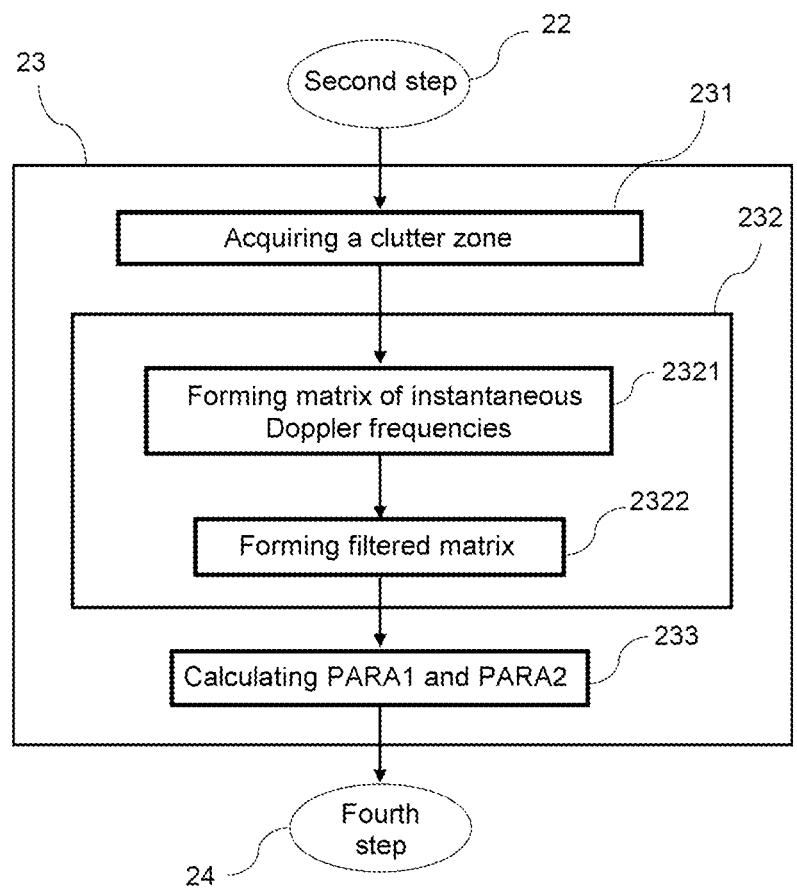
FIG. 3, a theoretical flow diagram detailing the third step of the method according to the invention.

The third step 23, illustrated by FIG. 3, is an iterative step whose function is to determine, for each of the zones defined by the acquisition plan, the value of two parameters PARA1 and PARA2, functions of the Doppler frequency of the clutter measured over the zone considered. This third step itself comprises three substeps:
- a first substep 231 of acquiring the signal corresponding to the zone considered;
- a second substep 232 of Doppler preprocessing which implements:
  - a first operation 2321 of calculating the matrix of instantaneous frequencies of the signal represented in the distance/time (or distance/recurrences) space;
  - a second operation 2322 of calculating the noise-free matrix of the instantaneous frequencies;
- a third substep 233 of calculating, for each zone, the value of two parameters PARA1 and PARA2 from the noise-free matrix of the instantaneous frequencies;

The acquisition, during the third substep 231, of the signal reflected by each zone, is performed in a conventional manner and is not detailed here. It is however specified that this acquisition is performed by effecting compensation of the movement of the radar so that one and the same clutter element is located at the same distance throughout the acquisition time.

According to the invention, the signal acquired during the first substep 231 of the step 23, which corresponds to a given clutter zone characterized by a number of distance cells (Ncd) which corresponds to the number of distance cells over the distance interval being studied, and a number of recurrences (Nrec) which corresponds to the number of recurrences emitted during the analysis time. For each of the distance cell/recurrence pairings, the radar determines a clutter sample in the form of a complex amplitude.

From these samples, the instantaneous Doppler frequency (i.e. the Doppler frequency measured for each distance cell and a given recurrence) is determined by applying the following formula:

$$f_d = \frac{d\varphi \times PRF}{2 * \pi} \qquad [03]$$

in which the PRF (Pulse Repetition Frequency) factor represents the repetition period, or recurrence period, of the radar, a period equal to 1950 Hz for example, and corresponds to the number of recurrences emitted in one second; and in which dφ is the phase difference, for a given distance cell, between the clutter samples (i.e. samples of the signal received by the radar) measured for two consecutive recurrences.

The construction of the matrix of the instantaneous frequencies in the distance/time (or distance/recurrences) space formed by all of the instantaneous Doppler frequencies calculated for all the distance cells of the zone considered and for all the recurrences of the analysis period is performed by the first operation 2321 of the substep 232.

The matrix thus obtained is, however, difficult to use as is. Indeed, the variation of the Doppler frequency from cell to cell and from recurrence to recurrence appears very noisy so that it is difficult to determine a wave height from the Doppler frequency variations.

To overcome this drawback, the substep 232 of the method according to the invention implements a second operation 2322, the object of which is to reinforce the contrast of the image represented by the matrix obtained after implementation of the operation 2321.

This second operation performs the construction of a noise-free matrix of the instantaneous frequencies, that is to say a matrix stripped of all the noise provoked, in particular, by the strong variability of the sea clutter.

This stripped matrix is obtained by applying a low-pass filtering function consisting, for example, in performing the convolution of the matrix of the instantaneous frequencies obtained after execution of the operation 1321 with a matrix that is a multiple of the identity matrix, whose coefficients are all equal, for example a 5 by 11 matrix in which all the coefficients have the value $1/55$.

Figure 4:
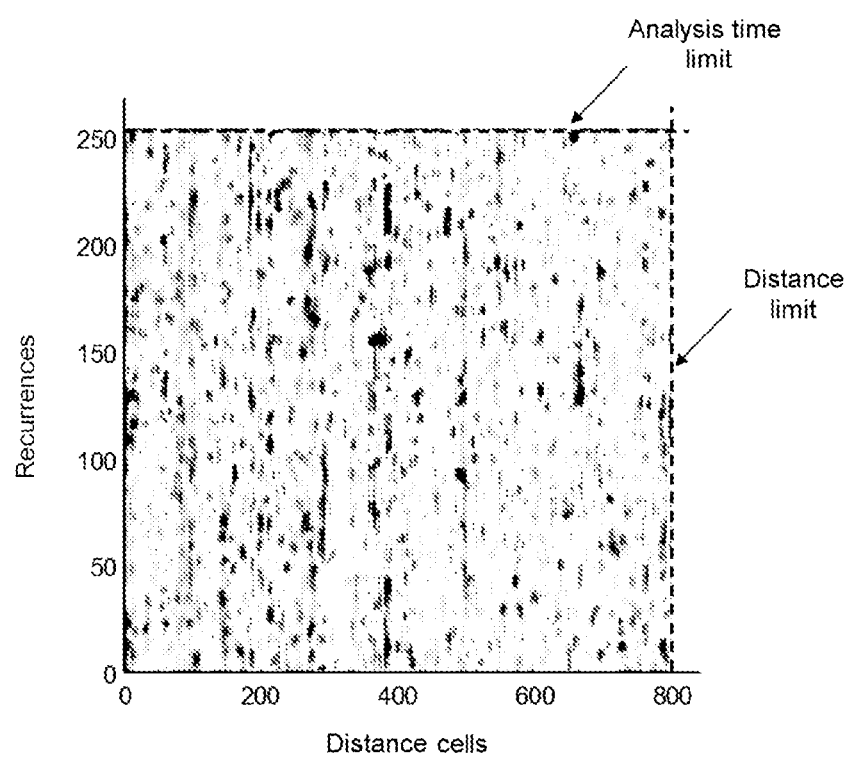
FIG. 4, a simplified, monochrome image graphically representing the matrix of the corrected instantaneous Doppler frequencies, obtained, according to the invention, by preprocessing of the matrix illustrated by FIG. 3.

Thus, as the representation of FIG. 4 illustrates, a corrected matrix of the instantaneous frequencies is obtained which shows clearer Doppler frequency variations revealing distance cells for which the Doppler frequency is higher (black lines in FIG. 4) and others or it is lower.

Also according to the invention, the two parameters PARA1 and PARA2, calculated during the third substep 233, advantageously allow best use of the correlations between the modulation of the instantaneous Doppler frequency of the clutter signal reflected by the sea and the wave height.

The first parameter, PARA1, corresponds to the standard deviation of the average Doppler frequencies calculated for each distance cell, over all of the recurrences. This parameter is determined in two stages:

a first stage during which there is the calculation, for each distance cell, of the average Doppler frequency over all of the recurrences defining the zone considered, $\widehat{fd}_{icd}$, defined by the following relationship:

$$\widehat{fd}_{icd} = \frac{1}{Nrec} \times \sum_{irec=1}^{Nrec} fd_{icd,irec} \qquad [04]$$

in which $fd_{icd,irec}$ represents the filtered Doppler frequency (low-pass filtering) associated with the distance cell icd and with the recurrence irec.

a second stage during which there is the calculation of the parameter PARA1 proper, this first parameter being defined by the following relationship:

$$PARA1 = \sqrt{\frac{1}{Ncd} \times \sum_{icd=1}^{icd=Ncd} \left(\widehat{fd}_{icd} - \widehat{\widehat{fd}}_{cd}\right)^2} \qquad [05]$$

in which $\widehat{\widehat{fd}}_{cd}$ represents the average value of the values $\widehat{fd}_{icd}$.

The second parameter, PARA2, corresponds to the ratio of the first parameter PARA1 to the standard deviation of the average Doppler frequency for each recurrence. This second parameter is also determined in two stages:

a first stage during which there is the calculation, for each of the average Doppler frequency for each recurrence $\widehat{fd}_{irec}$ defined by the following relationship:

$$\widehat{fd}_{irec} = \frac{1}{Ncd} \times \sum_{icd=1}^{icd=Ncd} fd_{icd,irec} \qquad [06]$$

a second stage during which there is the calculation of the parameter PARA2 proper, this first parameter being defined by the following relationship:

$$PARA2 = \frac{PARA1}{\sqrt{\frac{1}{Nrec} \times \sum_{irec=1}^{irec=Nrec} \left(\widehat{fd}_{irec} - \widehat{\widehat{fd}}_{rec}\right)^2}} \qquad [07]$$

in which $\widehat{\widehat{fd}}_{rec}$ represents the average value of the values $\widehat{fd}_{irec}$.

Figure 5:
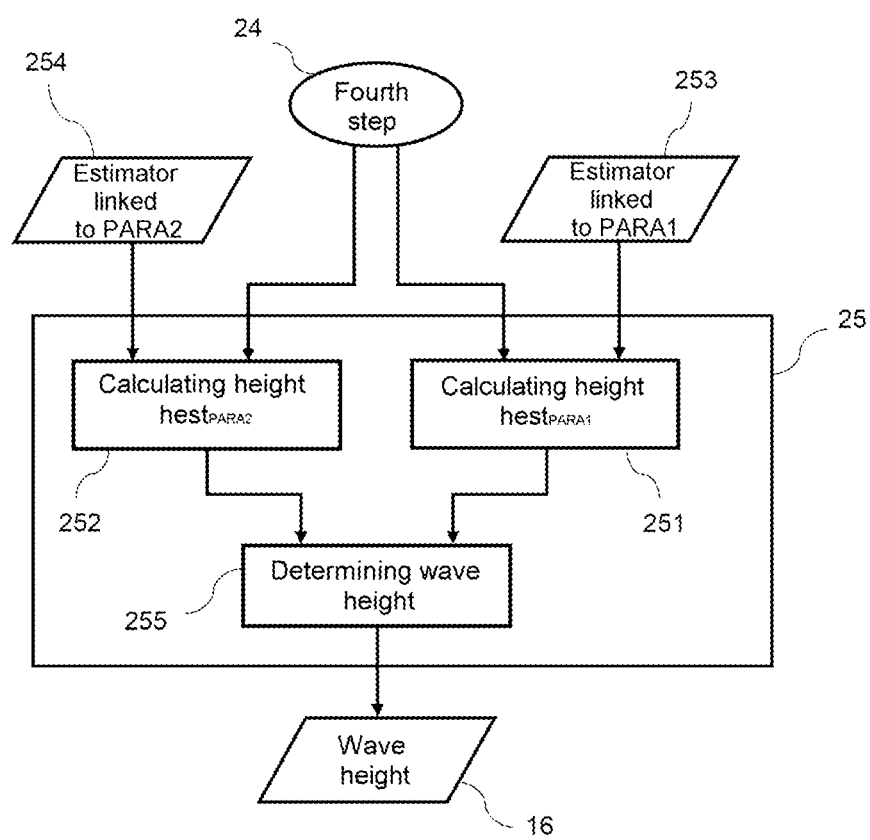
FIG. 5, a theoretical flow diagram detailing the fifth step of the method according to the invention.

The fifth step 25, illustrated by FIG. 5, performs the actual estimation of the wave height from the parameters PARA1 and PARA2 calculated during the step 23 of the method according to the invention. The wave height 26 thus estimated is taken into account by the aircraft in the water landing phase, notably to determine whether the limiting conditions of wave height allowing the water landing are not exceeded.

This estimation is preceded by the step 24 of calculation of the average value of each of the parameters PARA1 and PARA2 over all of the zones considered, the taking into account of an average value advantageously allows, for each of the parameters, a single, more reliable value to be obtained.

For each of the parameters PARA1 and PARA2, the step 25 of the method according to the invention implements estimators, 253 and 254, linking the value of the parameter considered, PARA1 or PARA2 respectively, to the wave height.

Thus, there is the calculation, for each of the parameters PARA1 and PARA2, of a first estimation of the wave height, $hest_{PARA1}$ and $hest_{PARA2}$ respectively, the calculation being performed for each parameter, by using a given estimator which expresses the estimated wave height as a function of the value of the parameter considered.

According to the invention, these estimators 253 and 254 are determined beforehand in a learning phase.

They can follow different models (linear, polynomial, etc.). In the case of a linear estimator, the estimated wave height, $hest_p$, is for example determined, from the value p of the parameter considered (i.e. PARA1 or PARA2), by the following relationship:

$$hest_p = A \times p + B, \qquad [08]$$

in which A and B represents the coefficients of the model, determined beforehand.

Consequently, the estimated height, Hest, is determined from the first estimations $hest_p$, calculated, during the operations 251 and 252, from the chosen estimators 253 and 254.

According to the invention, the estimated height 26 can be obtained in different ways.

Thus, for example:

in a particular form of the method according to the invention, the estimated height 26 is obtained by comparing the first estimations of the wave heights $hest_{PARA1}$ and $hest_{PARA2}$ delivered by each of the estimators and by retaining the highest value. The following then applies:

$$Hest = \max(hest_{PARA1}, hest_{PARA2}), \qquad [09]$$

in an alternative embodiment, the estimated wave height 26 is obtained by calculating the average of the first estimations of the wave heights $hest_{PARA1}$ and $hest_{PARA2}$ delivered by each of the estimators;

in another alternative embodiment, the estimated wave height 26 is obtained by producing a weighted sum of the first estimations of the wave heights $hest_{PARA1}$ and $hest_{PARA2}$ delivered by each of the estimators.

The invention claimed is:

1. A method for determining the height of the waves using a radar borne by an aircraft, comprising the following steps:
   a first step of pointing the antenna of the radar, said pointing being performed in such a way that the direction targeted by the radar corresponds to the direction of origin of the swell;
   a second step of determining the plan of acquisition of the clutter, said plan defining, as a function of the altitude of the aircraft, the number of zones to be acquired, the time of acquisition for each zone and the position and the length of the zones;
   a third step of determining, for each zone of clutter defined by the acquisition plan, two parameters PARA1 and PARA2 corresponding respectively, for a given zone, to the standard deviation of the average Doppler frequencies calculated, for each distance cell, over all of the recurrences forming the zone considered and to the ratio of the first parameter PARA1 to the standard deviation of the average Doppler frequency calculated for each recurrence over all of the distance cells forming the zone considered;
   a fourth step of calculating, for each of the parameter PARA1 and PARA2 calculated in the third step, the average value of said parameter over all of the zones considered;
   a fifth step of actually estimating the wave height from the averages of the parameters PARA1 and PARA2 calculated in the fourth step;
the wave height thus estimated being transmitted to the aircraft to determine the water landing conditions thereof.

2. The method as claimed in claim 1, wherein the third step itself comprises three sub steps:
   a first sub step of acquiring the signal corresponding to the zone considered;
   a second substep of Doppler preprocessing which determines the matrix of the instantaneous frequencies of the signal received, represented in the distance/time (or distance/recurrences) space;
   a third substep of calculating, for each zone, the value of the two parameters PARA1 and PARA2 from the matrix of the instantaneous frequencies delivered by the second substep.

3. The method as claimed in claim 2, wherein the second substep of the third step of Doppler preprocessing, implements:
   a first operation of calculating the matrix of the instantaneous frequencies of the signal represented in the distance/time (or distance/recurrences) space;
   each instantaneous Doppler frequency $f_d$ of said matrix being determined, for each distance cell and each recurrence defining the zone considered, from the relationship:

$$f_d = \frac{d\varphi \times PRF}{2 * \pi}$$

wherein PRF represents the recurrence period of the radar and wherein $d\varphi$ represents the phase difference, for a given distance cell, between the clutter samples received by the radar for two consecutive recurrences;
   a second operation of calculating a noise-free matrix of the instantaneous frequencies, said matrix being obtained by applying a low-pass filter to the matrix of the instantaneous frequencies calculated by the first operation.

4. The method as claimed in claim 1, wherein the fifth step performs:
   the calculation, for each of the parameters PARA1 and PARA2, of a first estimation of wave height, $hest_{PARA1}$ and $hest_{PARA2}$ respectively, the calculation being performed for each parameter, by using a given estimator which expresses the wave height estimated as a function of the value of the parameter considered;
   the preparation of a consolidated estimation, Hest, of the wave height, this estimation being a function of the first estimations of wave heights $hest_{PARA1}$ and $hest_{PARA2}$ previously calculated.

5. The method as claimed in claim 4, wherein the first estimations of the wave heights $hest_{PARA1}$ and $hest_{PARA2}$ are determined by means of linear estimators by the relationship:

$$hest_p = A \times p + B,$$

wherein p is the value of the parameter considered, PARA1 or PARA2, and wherein A and B represent the coefficients, previously determined, of the estimator considered.

6. The method as claimed in claim 4, wherein the consolidated estimation of the wave height is defined as being equal to the greatest of the first estimations of wave heights $hest_{PARA1}$ and $hest_{PARA2}$:

$$Hest = \max(hest_{PARA1}, hest_{PARA2}).$$

7. The method as claimed in claim 4, wherein the consolidated estimation of the wave height is defined as being equal to the average of the first estimations of wave height $hest_{PARA1}$ and $hest_{PARA2}$.

8. The method as claimed in claim 4, wherein the consolidated estimation of the wave height is defined as being equal to a weighted sum of the first estimations of wave height $hest_{PARA1}$ and $hest_{PARA2}$.

\* \* \* \* \*

UNITED STATES PATENT AND TRADEMARK OFFICE
CERTIFICATE OF CORRECTION

PATENT NO. : 11,668,813 B2
APPLICATION NO. : 15/734667
DATED : June 6, 2023
INVENTOR(S) : Pierre-Albert Breton et al.

It is certified that error appears in the above-identified patent and that said Letters Patent is hereby corrected as shown below:

In the Claims

In Claim 4, Column 10, Line 33, "hest$_{FARA1}$ and hest$_{FARA2}$" should be -- hest$_{PARA1}$ and hest$_{PARA2}$ --.

In Claim 4, Column 10, Line 40, "hest$_{FARA1}$ and hest$_{FARA2}$" should be -- hest$_{PARA1}$ and hest$_{PARA2}$ --.

In Claim 5, Column 10, Line 43, "hest$_{FARA1}$ and hest$_{FARA2}$" should be -- hest$_{PARA1}$ and hest$_{PARA2}$ --.

In Claim 6, Column 10, Line 54, "hest$_{FARA1}$ and hest$_{FARA2}$" should be -- hest$_{PARA1}$ and hest$_{PARA2}$ --.

In Claim 6, Column 10, Line 57, "Hest = *max* (hest$_{FARA1}$, hest$_{FARA2}$)." should be -- Hest = *max* (hest$_{PARA1}$, hest$_{PARA2}$). --.

In Claim 7, Column 10, Line 60, "hest$_{FARA1}$ and hest$_{FARA2}$" should be -- hest$_{PARA1}$ and hest$_{PARA2}$ --.

In Claim 8, Column 10, Line 64, "hest$_{FARA1}$ and hest$_{FARA2}$" should be -- hest$_{PARA1}$ and hest$_{PARA2}$ --.

Signed and Sealed this
Twenty-second Day of August, 2023

Katherine Kelly Vidal
*Director of the United States Patent and Trademark Office*